Feb. 24, 1948.  W. F. ALLENBY  2,436,540
HANDHELD POWER TOOL
Filed Aug. 31, 1944  3 Sheets-Sheet 3

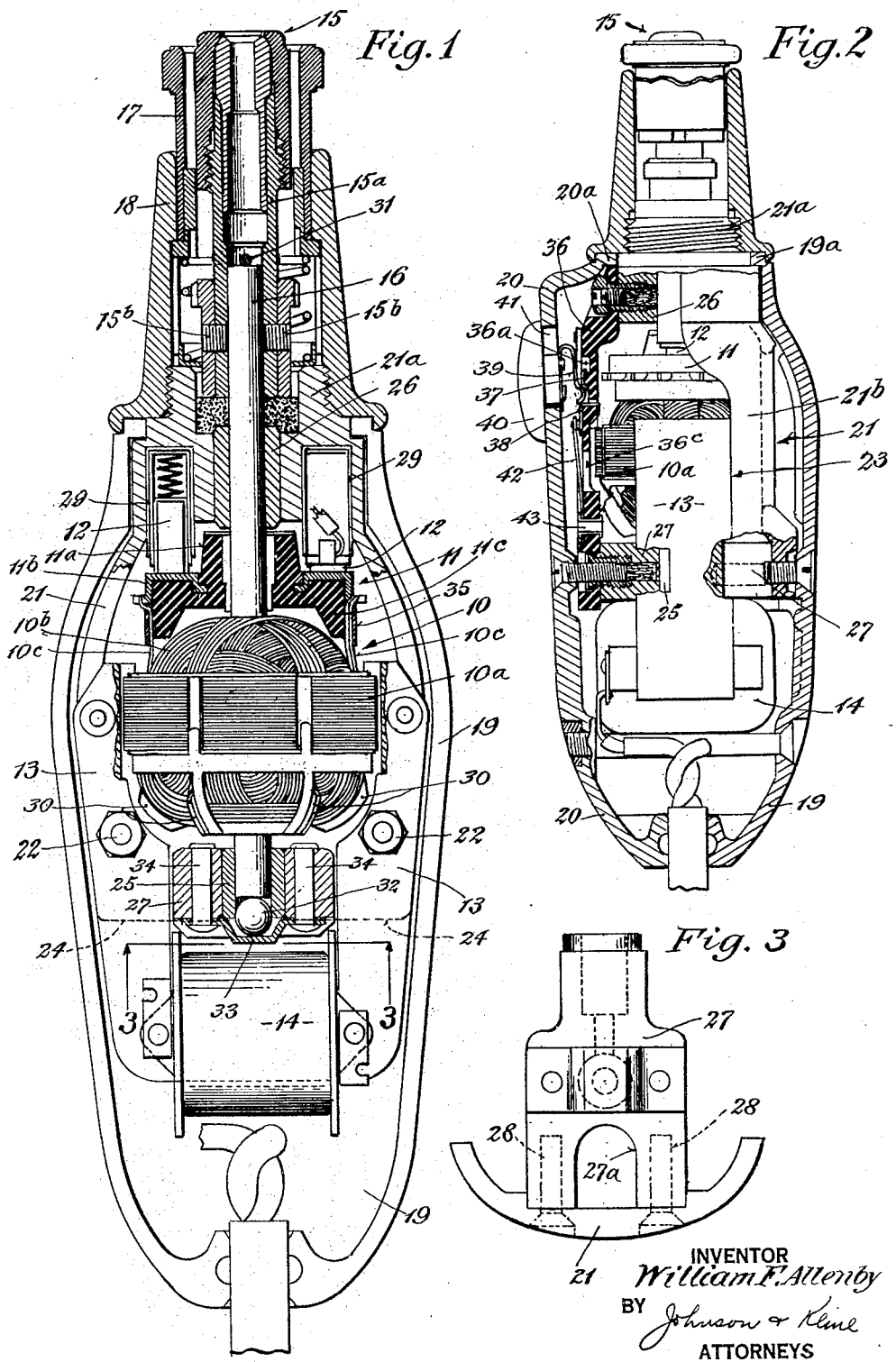

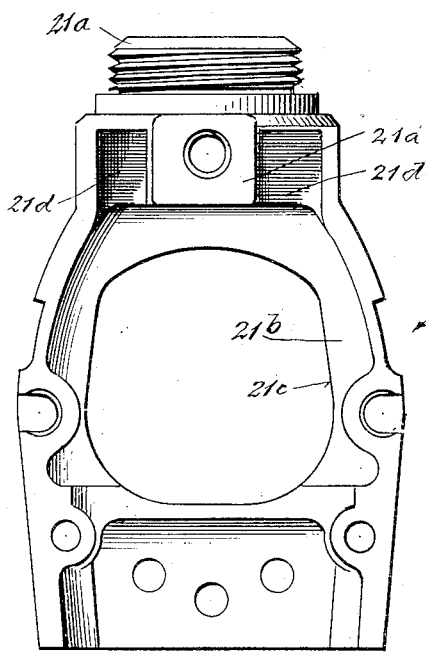
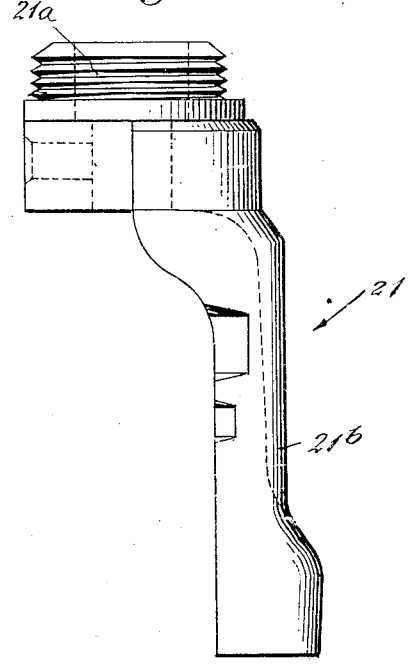
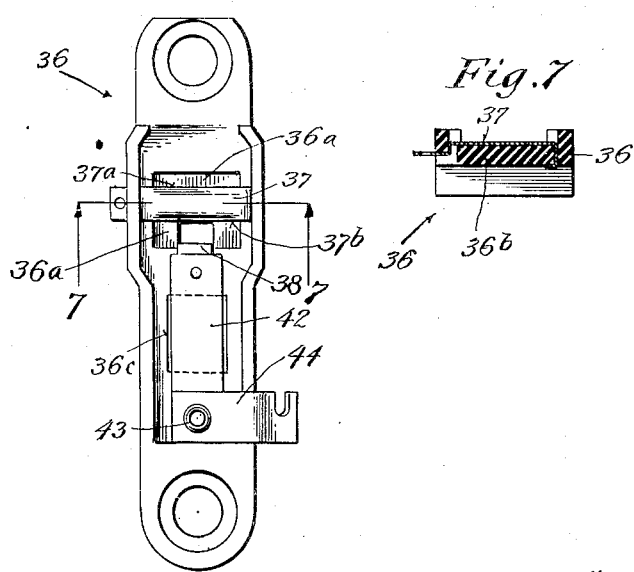

INVENTOR
William F. Allenby
BY Johnson & Kline
ATTORNEYS

Patented Feb. 24, 1948

2,436,540

UNITED STATES PATENT OFFICE 2,436,540

HAND-HELD POWER TOOL

William F. Allenby, Stratford, Conn., assignor to Casco Products Corporation, Bridgeport, Conn., a corporation of Connecticut Application August 31, 1944, Serial No. 552,185

7 Claims. (Cl. 172—36)

This invention relates to small handheld electric power tools, and more particularly to improvements in a tool of the type shown in Patents #2,319,194 and #2,339,829, issued to Joseph Youhouse on May 11, 1943, and January 25, 1944, respectively.

Attention is called to my application, Serial No. 668,798, filed May 10, 1946, claiming subject-matter shown herein.

In tools of this type, characteristics which assume prime importance are lightness of weight and smallness of size, since a heavy or bulky tool would seriously adversely affect the skill with which the various grinding, drilling and cutting operations may be carried out, especially if the tool is used over a protracted period of time. While it is desirable to maintain small weight and size, these factors are generally balanced against power and sturdiness, the latter being made sufficient for the practical purposes of the tool. However, because of the nature of the work done by small handheld tools of this type, overloading as regards power output, applied mechanical pressures, strains and vibrations is quite prevalent, so that carefully designed and calculated balances are upset, and damage to and failure of the tool may result.

In the latter-named of the above-mentioned patents, thermo-responsive means are provided for protecting the motor of the tool from burnout during severe or overload conditions of usage by temporarily automatically disconnecting it from the circuit, which as a result renders the tool inoperative for a short period.

An object of the present invention is to provide a tool of this type in which the cut-out of the motor due to overload is more reliable, in which the cut-out periods are reduced in duration and frequency to a minimum so that the tool will withstand more overload without becoming inoperative, and also in which means are provided for enabling the tool structurally to withstand greater pressures, strains and vibrations especially during such overloads, where considerable heat may be involved, thus enabling the tool to generally have greater usefulness.

This is accomplished by the provision, in a tool of the above type, of a combination of motor and cast-metal subframe in intimate heat-conducting relation with the motor, for supporting the armature and field of the latter substantially as a unitary rigid structure. The subframe is of cast metal, as for instance aluminum, preferably having a comparatively high heat conductivity, and is cut away to permit efficient ventilation of the armature while at the same time retaining a large heat-dissipating area and structural rigidity, the entire assembly of frame and motor being enclosed in an insulating casing having ventilating perforations and a shape to enable it to be gripped by and held in the hand. The cast-metal subframe is located in the path of air currents created by fan blades of the motor armature, so that rapid and efficient dissipation of heat from the frame is provided for. Thus, a considerable amount of the excessive heat generated in the motor windings due to continued use or overload will be quickly carried off and dissipated by the cast-metal subframe, and by preventing the heat from accumulating, the subframe will keep the motor cooler so that the thermo-protective device of the tool does not so frequently open the motor circuit.

To further enable the tool to safely carry overloads without damage, means are provided to assure a more reliable response of the thermo-responsive cut-out to dangerous overheating of the motor by an arrangement which enables radiated heat, as well as conducted heat and convection heat to act on the cut-out. This is accomplished by a mounting for the bimetallic thermostat arm whereby its broad side is exposed directly to the motor armature, to receive radiated heat from the latter. Thus the motor of the tool may be consistently overloaded without danger of burnout.

Also, the heating of the motor will not adversely affect the rigid subframe to misalign, or impair the running of, the motor since the frame is a rigid metal casting having reinforcing webs, nor will the casting yield when subjected to heavy vibrations, pressures or strains associated with the overloading of the motor as resulting from manipulation of the tool.

By the use of aluminum or a light-weight alloy for casting the subframe of the tool, and by providing cut-out portions serving for ventilation, the weight of the tool is not appreciably increased, nor is its size, yet as pointed out above, the structural strength and load capacity are considerably increased, thus resulting in a tool of increased usefulness.

Associated and cooperating with the thermo-responsive cut-out is an improved and simplified switching mechanism having a detent action, especially when in "on" position, which maintains the motor circuit closed despite the excessive vibrations to which the tool might be subjected during normal or even difficult or heavy work. In the switch, a pair of contacts are bridged by a movable spring-urged member, the contacts being shaped and mounted to provide a cavity between them which makes possible a detent action so that the pressure of the movable member maintains the latter at rest in its bridging circuit-closing position over the cavity whereby the effect of vibration serves to seat rather than dislodge the movable member.

Combining to provide a tool according to the present invention adapted to withstand severe or overload conditions of use, such as severe vibration, strains, etc., is an improved tool-bit carrier provided with simplified abutment means for engaging the square-cut end of the armature drive shaft, to prevent shifting of the carrier with relation to the shaft during extreme conditions of pressure on the tool bit, or of vibration resulting from such pressure during operation of the tool. In conjunction with this, an improved thrust-bearing means is provided at the other end of the armature shaft for withstanding the comparatively heavy vibratory thrust forces over protracted periods of use.

The effect on the armature windings of vibration of the tool is minimized by the provision, according to this invention, of a rigidly mounted supporting band between the commutator and armature coils to which band the lead wires from the armature are bound. In the illustrated embodiment of the invention the supporting band is made as an integral part of the molded commutator body, so that the lead wires may be secured to the commutator structure by a strong vibration-resistant binding in addition to the soldered electrical connections commonly employed, which latter, if not reinforced by additional means, often work loose when subjected to vibrating forces because of variations in soldering technique and skill employed.

Other features and advantages will hereinafter appear.

In the accompanying drawings—

Figure 1 is an axial section of a handheld power tool embodying the present invention.

Fig. 2 is an axial section of the tool, taken at right angles to the section of Fig. 1.

Fig. 3 is a fragmentary cross-section taken on the line 3—3 of Fig. 1.

Fig. 4 is a face view of the cast-metal subframe of the tool.

Fig. 5 is a side elevation of the subframe.

Fig. 6 is a face view of the switch plate and contacts of the tool.

Fig. 7 is a section taken on the line 7—7 of Fig. 6.

Figure 8:
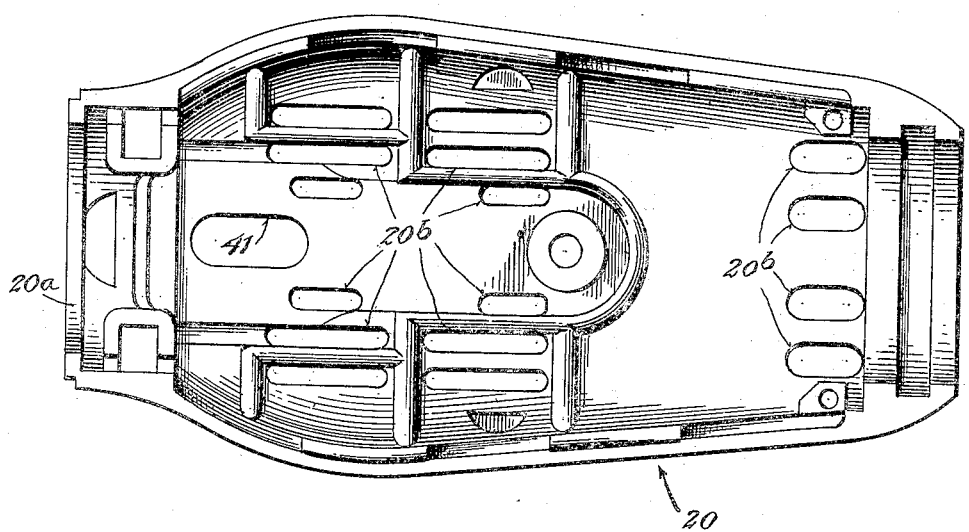
Fig. 8 is an inside view of one of the casing halves, slightly modified.

Referring to Figs. 1 and 2, the tool of the present invention comprises an electric motor having an armature 10 and disk commutator 11, the latter being engaged by brushes 12, and the motor having a field structure 13 and field coil 14 for cooperating with the armature.

A tool chuck 15 is mounted on one end of the armature shaft 16 to rotate with the latter and carry a tool for performing work, the chuck, armature shaft and other parts of the motor being enclosed in a casing comprising a pair of tubular telescoping sleeves 17 and 18 joined with half shells 19 and 20, which latter form the main body portion of the casing.

According to the present invention, a rigid cast-metal subframe 21, Figs. 2, 3, 4 and 5, is provided within and spaced from the half shells 19 and 20 for the purpose of rigidly supporting the armature field and other parts of the motor and holding same perfectly aligned even during severe and overload conditions of usage, and for aiding in the rapid dissipation of heat from the motor during such overload conditions without excessive heating of the shells 19 and 20. As a result, the tool of this invention may be subjected to a considerable overload without causing overheating or misalignment of the motor, since the heat is quickly and efficiently carried off, and since the motor parts are rigidly held against displacement by the cast-metal subframe, and the tool does not become uncomfortably hot to the touch during use.

Figure 9:
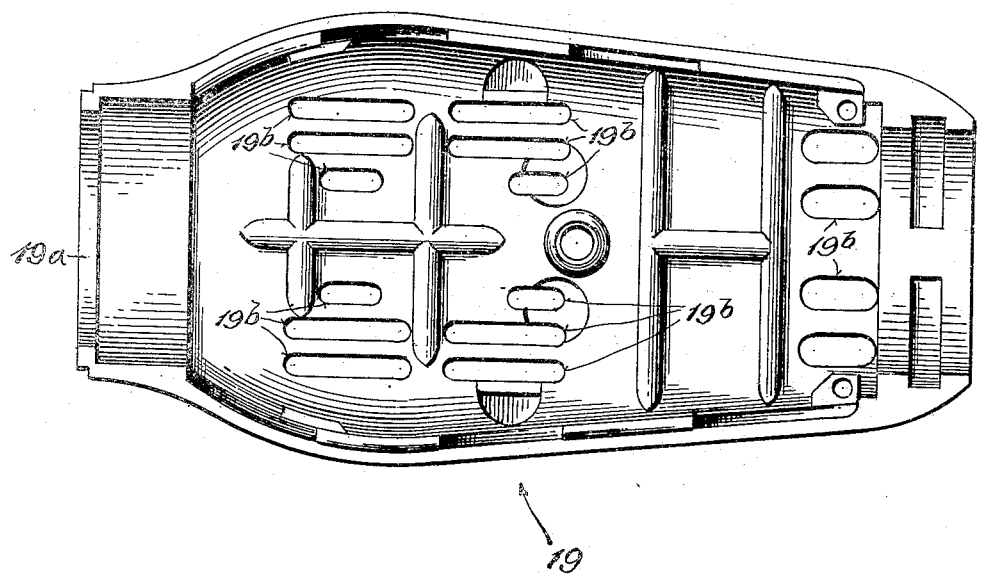
Fig. 9 is an inside view of the other casing half, slightly modified.

Referring to Figs. 1, 2, 4 and 5, the subframe 21 has an externally threaded collar portion 21a on which the sleeve 18 of the casing is threaded, the latter having a circular shouldered flange 18a encircling semi-circular end portions 19a and 20a of the casing half-shells to hold the latter in assembled position. The casing shown in Figs. 1 and 2 is a slightly modified form adapted to engage the connector cord directly, while the half-shells shown in Figs. 8 and 9 are adapted to receive a plug connector similar to that illustrated in the aforementioned patents.

As shown in Figs. 1 and 2, the field core structure 13 is secured directly to the subframe 21 by studs and nuts 22, the subframe and field structure having a comparatively large area of contact as shown by the line 23, Fig. 2, and the dotted lines 24, Fig. 1, so that the subframe is in intimate heat-receiving relation with the field structure.

The armature 10 of the motor, carried by the shaft 16, is journaled in bearing sleeves 25 and 26, the latter being press-fitted in the collar portion 21a of the subframe, and the sleeve 25 being fitted into a metal bearing block 27 mounted by screws 28 on the body portion 21b of the subframe. As seen in Fig. 4, the body portion 21b of the subframe is cut-away to provide a comparatively large ventilation aperture 21c which also provides clearance for the armature laminations 10a and also reduces considerably the weight of the subframe. The width of the aperture 21c is preferably approximately equal to the diameter of the armature windings 10b, to provide a large area for circulating air currents. Also, the bearing block 27 is cut away at 27a to provide for lightness and to permit cooling air currents to pass through.

By this construction heat which is generated in the field coil 14 and transmitted to the field structure 13 will be quickly carried off by the cast-metal subframe 21, due to the large surface contact between said structure and subframe. Likewise, heat generated in the armature windings 10b and transmitted to the laminations 10a and shaft 16 will be carried off through the bearing sleeves 25 and 26 to the subframe 21 for dissipation by the latter. Moreover, the heating of the subframe 21, and the mechanical stresses resulting from operation of the tool will not distort or otherwise deform the frame, so that proper alignment of the armature 10 and field structure 13 will be maintained, as well as alignment of the bearing sleeves 25 and 26, thus preventing the shaft 16 from binding.

The subframe 21 is provided with a pair of recesses 21d in which the brushes 12 are carried, the latter being press-fitted into the recesses with strip insulation 29, as shown in Fig. 1. Accordingly, the brushes 12 will also be maintained in accurate alignment regardless of working stresses existing in the tool, since the brushes are carried by rigid cast metal.

Referring to Figs. 2 and 9, the shell 19 of the casing is provided with elongate apertures 19b some of which are located adjacent the large aperture 21c of the subframe 21, and the shell 20 of the casing, Fig. 8, provided with similar apertures 20b, so that an efficient ventilation of the motor is provided. The air currents set up by the rapidly rotating armature 10 may thus travel laterally out of the casing shells 19 and 20 and in so doing carry heat from the motor armature and also from the cast-subframe 21, the latter thereby dissipating at a rapid rate the heat it receives from the motor armature and field. Air currents may also pass through the recess 27a in the bearing block 27 to cool the latter. Preferably, the subframe 21 and bearing block 27 are cast of aluminum which has a high heat-conductivity factor, so that the cooling of the motor is further effectively carried out.

As shown in Figs. 1 and 2 the metal sub-frame 21 is spaced from the half shell 19 in an area surrounding the armature and laterally thereof, and the frame 21 does not extend in the region of the field coil 14 but instead the latter is spaced a substantial distance from the half-shells 19 and 20, thereby effectively preventing conduction of heat from the frame and the field coil to the shell, and as a result the shell halves remain relatively cool during operation of the tool.

To increase the ventilation of the motor, the armature 10 is provided with a fan-blade structure 30, Fig. 1, which functions in the manner of a centrifugal blower so that air currents are set up under a constant pressure during operation of the tool.

Referring to Fig. 1, means are provided, associated with the shaft 16, for the purpose of enabling the tool to successfully withstand considerable thrust stresses, including those resulting from severe vibrations incidental to the nature of the operations for which the tool is used. The chuck 15 is shown as including a sleeve 15a which is secured on the end of the shaft 16 by a pair of oppositely located set screws 15b. For engagement with the end of the shaft 16, there is provided a pin 31 diametrically disposed in the sleeve 15a and secured in place in a suitable manner as by upsetting the ends of the pin. At the lower end of the shaft 16 an improved wear-resistant thrust bearing is provided in the form of a hardened steel ball 32 having a diameter substantially equal to that of the shaft 16 and engaging the ground end surface of the latter. A cupped thrust plate 33 is secured to the bearing block 27 by means of rivets 34, the cupped portion of the plate nesting the ball 32 and retaining the latter in the position shown wherein it engages not only the plate and shaft 16 but also the inner surface of the bearing sleeve 25. During rotation of the shaft 16 the ball 32, which is free to rotate, will be continuously turning in various directions as determined by the changing stresses on it, and therefore the wearing of the ball will take place uniformly, thus providing a sturdy bearing structure having long life. The bearing sleeves 25 and 26 are preferably of material having inherent lubrication, such as "Oilite" bearings. By virtue of the thrust means comprising the ball 32 and the pin 31, the rotating part of the tool is adapted to withstand sudden and severe thrust loads such as may be normally met when the tool is used for grinding or cutting operations on workpieces of hard material, or when the tool is being overloaded.

To further adapt the tool to withstand severe vibrations, an improved armature and commutator assembly is provided wherein the lead wires from the armature coils 10b may be securely bound at the points where they extend from the coils to the commutator 11, thereby preventing loosening of these leads throughout the useful life of the tool. As shown in Fig. 1, the commutator 11 which is of the disk type, comprises a molded hub 11a having embedded metallic segments 11b to which the armature leads 10c are soldered. The molded hub 11a of the commutator is provided with an integral skirt 11c extending toward the armature laminations 10a and enclosing a portion of the windings 10b. The armature lead wires 10c extend from the coils 10b past the periphery of the skirt 11c to the commutator segments 11b. To bind the lead wires 10c securely to the skirt 11c, a strip of adhesive tape 35 is wound around the wires and the skirt, the tape preferably being lapped on itself for approximately one-half turn. At the time that the armature assembly is completed, including the placing of the tape 35, the entire assembly is dipped in varnish and baked, thereby causing the tape 35 to be securely held in place. Thus the leads 10c may be securely bound against the skirt 11c, thereby eliminating unsupported stretches of wire which might, as a result of severe vibrations during continued use of the tool, ultimately break free from the commutator segments and cause failure of the tool.

By the provision of the cast-metal subframe 21, preferably of aluminum having high thermoconductivity, the operating temperature of the motor is maintained at a comparatively low value, which permits a greater overloading of the tool than was heretofore possible. In connection with such overloading the invention provides an improved heat-responsive automatic circuit breaker which reliably functions to disconnect the motor should the overloading become excessive and approach the danger point. This automatic cutout is associated with an improved vibration-resistant switch means so that more reliable operation of the tool is obtained during protracted heavy-duty work.

As shown in Figs. 2, 6 and 7, the cut-out and switch means is carried by an elongate molded plate 36 secured by screws to the bearing block 27 and collar 21a of the subframe, part of the switch being also carried by the shell 20 of the casing. As shown in Fig. 6, the plate 36 has in its outer face a recess 36a across which a rib 36b extends. An elongate sheet metal contact 37 is secured over the rib 36b, the side edges 37a and 37b of the contact being formed to extend somewhat into the recess 36a at each side of the rib 36b, thereby providing substantially a crowned outer surface on the contact. A second contact 38 is mounted at one edge of the recess 36a substantially level with the surface of the contact 37. As shown in Figs. 2 and 7, the plate 36 is provided with apertures so that the contacts 37 and 38 may be extended to the underside of the plate and bent over to securely hold them in place. Cooperating with contacts 37 and 38 is a U-shaped spring switch arm 39, Fig. 2, mounted on an insulating switch button 40 carried in a slot 41 in the shell 20. The spring 39 is formed at its free end to provide a convex surface for engagement with the contacts 37 and 38, the action of the arm being such that it functions as a detent to hold the switch in either open-circuit or closed-circuit position. Referring to Fig. 2, the arm 39 is shown bridging the contacts 37 and 38, thereby closing the switch circuit. When the arm 39 is in this bridging position its resiliency functions to maintain a positive connection between the contacts 37 and 38, and vibrations to which the tool may be subjected tend to maintain such connection rather than sever it. Therefore, the tool will be reliable in operation during conditions of severe vibratory use. If the button 40 should be moved upwardly as viewed in Fig. 2, the arm 39 would ride over and past the contact 37 so as to extend partially into the recess 36a, thereby retaining the switch in open-circuit position. Cooperating with the contact 38, as shown in Figs. 2 and 6, there is provided a bimetallic arm 42 secured to the plate 36 by a rivet 43. The arm 42 and the contact 38 are provided with cooperating contact points of suitable metal such as silver. Directly adjacent the bimetallic arm 42, the plate 36 is provided with an aperture 36c so that heat radiated from the armature of the motor may directly reach the arm 42 and raise the temperature of the latter. By the provision of the aperture 36c, the arm 42 is heated by radiation, in addition to its heating by convection and conduction, and therefore the response of the arm to overheating of the motor will be more reliable than was heretofore possible.

The switch and cut-out mechanism illustrated is connected in series with the motor circuit, one lead of the circuit being brought to the contact 37 and the other lead to a terminal strip 44 connected to the base of the bimetallic arm 42.

Variations and modifications may be made within the scope of this invention and portions of the improvements may be used without others.

I claim:

1. In a portable tool having a driving motor, a cast-metal skeleton frame for rigidly supporting the armature and field of the motor in fixed relative positions; an insulating casing enclosing the motor and skeleton frame; means carried by the skeleton frame for mounting a tool to extend exteriorly of the casing; and heat-responsive switch means mounted within the casing, for automatically opening the motor circuit in response to overheating of the motor, said switch means being exposed to and receiving heat from the motor armature by radiation, convection and conduction.

2. In a handheld portable tool having a driving motor, an elongate cast-metal skeleton frame having bearings at its ends between which the motor armature is journaled, said frame having a relatively great width exceeding the diameter of the armature core, and having an aperture located intermediate its ends and laterally of the armature core, the width of said aperture approximating the diameter of the armature windings and the frame rigidly carrying the field structure of the motor; centrifugal fan means carried by the motor armature in juxtaposition to the windings thereof for causing air to be thrown radially from the armature directly through the aperture in the frame; and an insulating casing enclosing the motor and skeleton frame, having vent openings adjacent the aperture of the frame whereby the said air thrown by the fan means through the said aperture passes out through the vent openings, to cool the motor.

3. The invention as defined in claim 2, in which the frame is in intimate heat-receiving relation with the motor armature and field, and is cast of high heat-conductivity metal thereby to conduct heat from the motor and reduce the operating temperature of same.

4. In a portable tool for use as a grinder, a rigid, unitary cast metal skeleton frame having a base portion provided with an integral collar and a bearing in said collar and having a second bearing rigidly connected to said collar; a motor carried by the frame, having an armature shaft journaled in said bearings, and having a field core secured to said frame, the supporting of the bearings being independent of said field core; a disk commutator carried by the shaft adjacent and facing the said collar; brushes bearing on the commutator; holders for the brushes, extending parallel to the shaft and embedded in the collar; a casing enclosing the frame, said casing including a finger-grip rigidly mounted on the collar; and means carried by the armature shaft adjacent the bearing in the said collar, for mounting a tool to extend through the finger-grip and exteriorly of the casing, the motor brushes, shaft and commutator being rigidly supported wholly by the cast frame and independently of the motor field core and the casing so that misalignment of the shaft bearings, commutator and brushes is prevented should the casing or field core become distorted when the tool is in use.

5. In a handheld tool having a driving motor, a cast skeleton frame of metal having high heat conductivity and comparatively large surface area, rigidly supporting the armature and field of the motor in fixed relative positions, said armature and field being in intimate heat-conducting relation with the frame whereby the latter dissipates heat from the motor at an efficient rate while rigidly supporting same during overload conditions; and an insulating casing adapted to be grasped by hand, enclosing the skeleton frame to prevent the latter from coming in contact with an operator, said casing being spaced from the frame and adjoining portions of the motor in the area surrounding the armature and laterally thereof to prevent heat conduction from the frame and motor to the casing in said area.

6. In a handheld power-operated tool, a casing; an electric motor in said casing having a shaft and tool-receiving means connected with the latter; switch means for controlling the motor, including a switch plate of insulating material mounted in the casing, having a pair of juxtaposed recesses; a pair of contacts mounted on the plate, one between and extending toward both the recesses and the other extending from the opposite edge of one recess; a button movably carried by the casing for manual operation from the exterior of the latter; a resilient metal spring connected to the button having a convexed portion adapted to ride over the recesses and contacts and bridge the latter when located over the recess between same, the spring providing a detent action in cooperation with the said recesses and contacts; and a bimetallic arm exposed to and in heat-receiving relation with the motor armature and receiving heat from the armature by conduction, convection and radiation, said arm being mounted on the switch plate to engage one of said contacts during normal operation of the motor, and to disengage said contact when the motor becomes overheated.

7. A portable hand-held grinding tool comprising a rigid unitary elongate cast metal skeleton frame having bearings at its opposite ends; a motor carried by the frame, having an armature shaft coextensive with the frame and journaled in said bearings; an elongate insulating casing enclosing the frame and motor, and shaped to be held in the hand; a tubular finger grip rigidly secured to one end of the frame and projecting longitudinally thereof and from the casing, one end of said shaft extending through said finger grip; a thrust ball carried in the bearing at the other end of the frame and engaging the frame and other end of the armature shaft to oppose thrust forces on the shaft; and means carried by the one end of the armature shaft for mounting a tool bit to extend through the finger grip and exteriorly of the latter and the casing, the thrust forces on the shaft resulting from engagement of the tool bit with the work being transmitted directly to the finger grip through the thrust ball and rigid cast metal frame without passing through the insulating casing.

WILLIAM F. ALLENBY.

REFERENCES CITED

The following references are of record in the file of this patent:

UNITED STATES PATENTS

| Number | Name | Date |
| --- | --- | --- |
| 1,048,466 | Sparks | Dec. 24, 1912 |
| 1,507,716 | Redman | Sept. 9, 1924 |
| 2,253,033 | Kochner | Aug. 19, 1941 |
| 2,258,561 | Youhouse | Oct. 7, 1941 |
| 2,282,582 | Henninger | May 12, 1942 |
| 2,291,775 | Tucker | Aug. 4, 1942 |
| 2,339,829 | Youhouse | Jan. 25, 1944 |
| 2,356,521 | Kochner | Aug. 22, 1944 |
| 1,372,482 | Clare | Mar. 22, 1921 |
| 1,975,646 | Luthy | Oct. 2, 1934 |
| 1,866,478 | Mortensen | July 5, 1932 |
| 1,892,997 | Oldenburg | Jan. 3, 1933 |
| 2,234,926 | Jepson | Mar. 11, 1941 |
| 2,188,170 | Zschau | Jan. 23, 1940 |
| 1,270,967 | Mizer | July 2, 1918 |

FOREIGN PATENTS

| Number | Country | Date |
| --- | --- | --- |
| 135,972 | Austria | Dec. 27, 1933 |